G. BRANDER.
DISH WASHING MACHINE.
APPLICATION FILED FEB. 5, 1910.
987,544.
Patented Mar. 21, 1911.
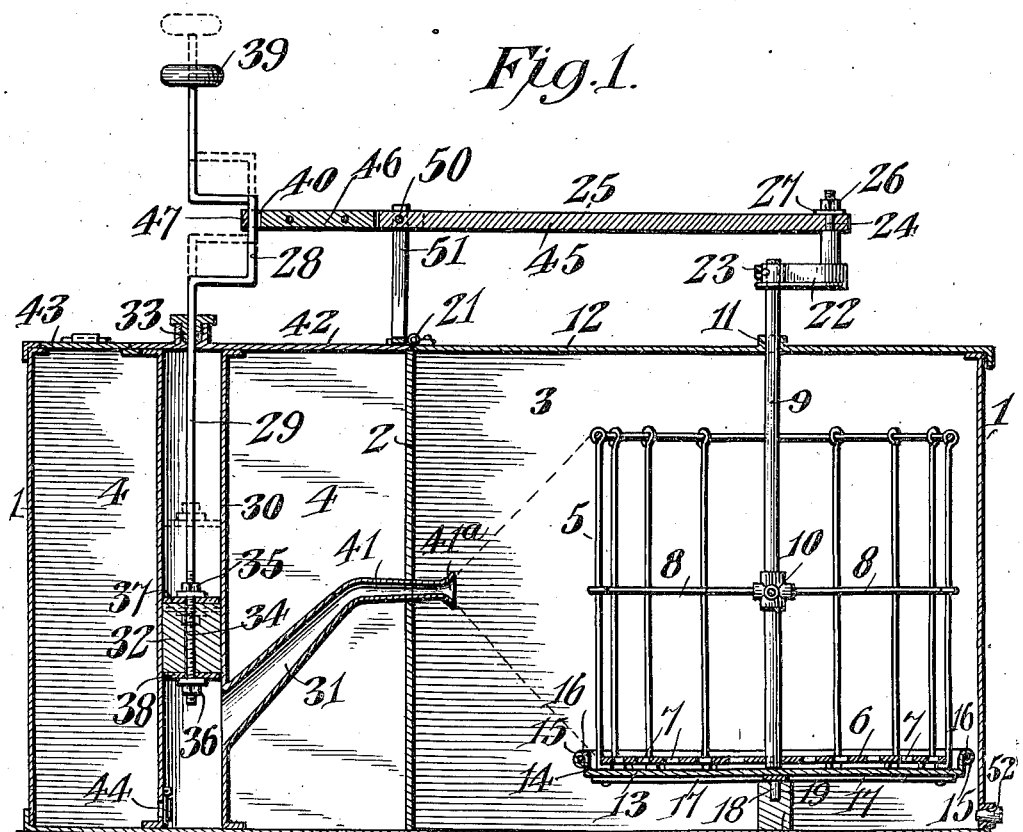
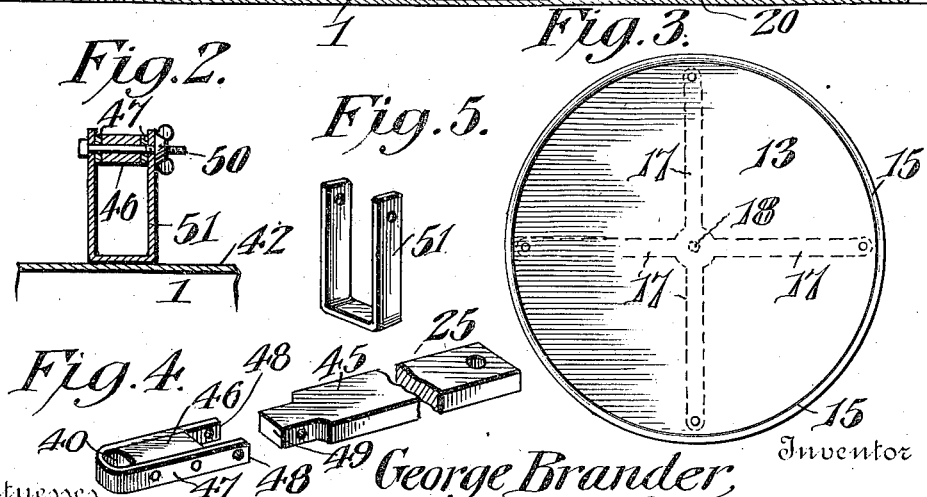
George Brander, Inventor

UNITED STATES PATENT OFFICE.

GEORGE BRANDER, OF SUTHERLAND, IOWA.

DISH-WASHING MACHINE.

987,544.  Specification of Letters Patent.  Patented Mar. 21, 1911.

Application filed February 5, 1910. Serial No. 542,234.

*To all whom it may concern:*

Be it known that I, GEORGE BRANDER, a citizen of the United States, residing at Sutherland, in the county of O'Brien and State of Iowa, have invented a new and useful Dish-Washing Machine, of which the following is a specification.

The invention relates to improvements in dish washing machines, and is a continuation of a previous application, filed June 14, 1909, Serial No. 502,099, for a similar machine.

The object of the present invention is to improve the construction of dish washing machines, and to provide a simple, inexpensive and efficient dish washing machine, equipped with a rotary basket for holding the dishes and other articles and having a pump for discharging water upon the contents of the basket, and equipped with operating mechanism capable of enabling the pump to be operated either simultaneously with or independently of the basket.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a vertical longitudinal sectional view of a dish washing machine, constructed in accordance with this invention. Fig. 2 is a detail sectional view, illustrating the manner of connecting the depending support with the pitman.
Fig. 3 is a plan view of the rotary basket-receiving platform. Fig. 4 is a detail perspective view of the pitman. Fig. 5 is a detail perspective view of the pitman support.

Like numerals of reference designate corresponding parts in all the figures of the drawing.

1 designates a casing constructed of sheet metal, or other suitable material and designed to be placed upon a stove or other suitable heater for heating the water used for washing dishes and other articles. The casing is divided by a transverse partition 2 into compartments 3 and 4. The compartment 3 constitutes a dish washing chamber and receives a rotary basket 5, which is adapted to hold dishes and other articles to be washed.

The rotary basket, which may be of any preferred construction, preferably consists of a horizontal bottom 6 of sheet metal, or other suitable material, and walls of stout wire. The bottom 6 of the basket may be provided with perforations 7 to permit the water sprayed on the dishes by the means hereinafter described, to drain from the basket. The basket is also preferably braced by horizontal cross wires 8, arranged diametrically and extending from a central vertical shaft 9 to the sides or walls of the basket about midway between the top and bottom thereof. The braces 8 are provided at their outer ends with eyes to receive the side wires of the basket, and their inner ends are connected with the shaft 9 by a coupling 10, having horizontal arms receiving the inner ends of the bracing wires, but the latter may be secured to the shaft and to the side walls of the basket in any other desired manner. The wires 8 besides bracing and strengthening the rotary basket serve as supports for holding plates and other dishes in an upright position facing downward, so as to subject them to the action of steam and hot water when the basket is rotated.

The upright portion of the vertical shaft 9 extends through a bearing 11 of a hinged section 12 of the top of the casing, and the basket is detachably arranged upon a horizontal platform or support 13. The rotary platform or support, which may be constructed of sheet metal, or other suitable material, is preferably provided with a peripheral wall or flange 14, preferably reinforced by a bead 15, containing a strengthening wire 16. The wall or flange 14 extends upwardly from the support or platform and retains the basket thereon. The rotary support or platform is secured by suitable fastening devices to the arms of a spider 17, which is provided with a depending pivot or spindle 18, mounted in a suitable bearing 19 of a transverse bar 20. The bar 20 is arranged upon the bottom of the casing and is suitably secured to the same. When the basket is removed from the rotary platform or support, articles too large to be placed in the latter may be arranged directly upon the rotary support for washing. The cover or section 12 of the top of the dish washing compartment or chamber 3 is hinged at its inner edge at 21 at a point above the partition 2.

The shaft 9 of the basket is equipped at its upper end with a removable crank arm 22, detachably secured to the shaft by a clamping screw 23, which permits the ready removal of the crank arm, when it is desired to open the dish washing chamber or compartment for taking out the basket after the contents thereof have been washed. The crank arm is provided with a terminal pivot 24, which pierces one end of a horizontal pitman 25, being detachably secured to the same by a nut 26. The nut 26 is arranged on the threaded portion of the pivot 24, the washer 27 being interposed between the nut and the pitman as shown. The other end of the pitman is connected with a crank bend 28 of a pump rod 29 of a pump, which is arranged in the tank or compartment 4. The pump consists of a vertical barrel or casing 30, a discharge spout 31 and a plunger 32, secured to the lower end of the pump rod 29. The pump rod 29, which is adapted to be reciprocated vertically through a stuffing box 33, has its lower terminal portion 34 threaded for the reception of upper and lower nuts 35 and 36, located above and below the plunger, washers being preferably interposed between the nuts and packing disks 37 and 38 at the upper and lower faces of the plunger. The plunger may be constructed in any other suitable manner, and it loosely receives the pump rod, which is adapted to turn freely in the plunger for operating the rotary basket. The upper end of the pump rod is equipped with a suitable head or handle 39, and the crank bend 28, which is composed of spaced horizontal portions and a connecting vertical portion, has its vertical portion arranged in an eye or opening 40 of the pitman. The length of the vertical portion of the crank bend being sufficient to permit a full stroke of the pump rod, which is adapted to be operated independently of the basket. The pump rod, which is raised and lowered to operate the pump, is also adapted to be turned in either direction to reciprocate the pitman and turn the basket to present different portions of its contents to the pump. The spout 31 is inclined and extends upwardly from the lower portion of the cylinder, and is provided with a horizontal terminal portion 41, extending through the partition and provided with a flared nozzle 41ª, arranged to discharge hot water and steam upon the basket from the top to the bottom thereof, as indicated in dotted lines in Fig. 1 of the drawing. The tank or compartment 4 is closed at the top by a fixed section 42, and a removable section 43, adapted to afford access to the interior of the tank or compartment 4 for supplying water to the same, or for any other purpose.

The water enters the pump barrel or casing at the lower end thereof through an inwardly opening valve 44, which is automatically closed by the internal pressure when the plunger is moved downward to force the water and steam through the nozzle.

The pitman 25 is composed of two sections 45 and 46. The section 46 is equipped with a metallic strap 47, bent into substantial U-shape and extending around the outer end of the section 46 to provide the eye or opening 40 for the reception of a crank bend of the pump rod. The terminals 48 of the sides of the strap are extended beyond the inner end of the section 46 to form spaced ears, and they receive between them the inner end 49 of the section 45, which is reduced, as clearly shown in Fig. 4 of the drawing, to fit between the ears or terminal portions 48. The two sections of the pitman are hinged together by a transverse bolt 50, which also connects a depending support 51 to the pitman. The support 51, which is constructed of suitable material, is approximately U-shaped, being in the form of a stirrup, as clearly shown in Fig. 5, and it is adapted to rest lightly upon the top of the casing, and it supports the pitman in a level position and permits the pump rod to be reciprocated without actuating the pitman. The pump rod is adapted to slide through the eye of the pitman, and the hinge connection between the sections is also provided to facilitate the reciprocation of the pump rod to prevent the latter from binding in the eye of the pitman. The operator reciprocates the pump rod for discharging the contents of the pump upon the dishes, or other articles placed in the basket, and the basket is adapted to remain stationary as long as desired by the operator, and it may partially rotate simultaneously with the operation of the pump by simply turning the pump rod.

The water within the tank is allowed to come to a boil, so that steam and hot water may be discharged upon the dishes contained in the basket. Each machine, especially when designed for large families, restaurants, and the like, will be equipped with a plurality of baskets in order that one basket may be used for draining and drying dishes while another is in use within the machine. A comparatively small amount of water will thoroughly wash and rinse the dishes after the latter have been subjected to the action of hot water and steam for a short time.

In practice the dish washing machine will be provided with a suitable drain opening 52, and equipped with means for enabling the greasy or dirty water to be drawn off as desired, and the casing may be mounted upon legs of sufficient length to enable the casing to be placed over a gasolene burner or other heating device for heating the water.

Having thus fully described my invention, what I claim as new and desire to secure by Letters Patent, is:—

1. A dish washing machine including a casing having a partition extending entirely across the casing and dividing the latter into a tank and a dish washing chamber, a rotary basket arranged within the dish washing chamber, a pump located within the tank and having a spout extending through the partition and provided with a terminal flaring nozzle arranged to discharge the contents of the pump upon the adjacent side of the basket from the top to the bottom thereof, and exteriorly arranged operating mechanism for rotating the basket and also for actuating the pump.

2. A dish washing machine comprising a casing, a rotary receptacle arranged within the casing, a pump also operating within the casing and arranged to discharge water upon the receptacle, and exteriorly arranged operating mechanism for rotating the basket and for actuating the pump, said mechanism having means for permitting a continuous independent operation of the pump while the receptacle remains stationary and without disconnecting the latter from the operating mechanism.

3. A dish washing machine including a casing, a rotary receptacle arranged within the casing and provided with a shaft having an exteriorly arranged crank element, a pump also operating within the casing and arranged to discharge water upon the rotary receptacle, said pump being provided with a reciprocatory and rotary pump rod having a crank element, and means for communicating rotary motion from the crank element of the pump rod to that of the basket for turning the latter, said means permitting an independent operation of the pump rod.

4. A dish washing machine including a casing, a rotary receptacle having a shaft provided with a crank element, a pump having a reciprocatory pump rod capable of rotary movement and provided with a crank element, and a pitman connecting the crank elements and composed of hinged sections and adapted to permit an independent operation of the pump rod.

5. A dish washing machine including a casing, a rotary receptacle having a shaft provided with a crank element, a pump having a reciprocatory pump rod capable of rotary movement and provided with a crank element, a pitman connecting the crank elements, the crank element of the pump rod being slidable through the pitman to permit an independent operation of the pump, and means for supporting the pitman during such independent operation.

6. A dish washing machine including a casing, a rotary receptacle having a shaft provided with a crank element, a pump having a reciprocatory pump rod capable of rotary movement and provided with a crank element, a pitman connecting the crank elements, the crank element of the pump rod being slidable through the pitman to permit an independent operation of the pump, and a support depending from the pitman and arranged to rest upon the casing.

7. A dish washing machine including a casing, a rotary receptacle having a shaft provided with a crank element, a pump having a reciprocatory pump rod capable of rotary movement and provided with a crank element, a pitman connecting the crank elements, the crank element of the pump rod being slidable through the pitman to permit an independent operation of the pump, and a support depending from the pitman and arranged to rest upon the casing, said support being pivotally connected with the pitman to permit a reciprocation thereof.

8. A dish washing machine including a casing, a rotary receptacle having a shaft provided with a crank element, a pump having a reciprocatory pump rod capable of rotary movement and provided with a crank element, a pitman composed of two sections connected at their outer ends with the crank elements, a pivot hinging the inner ends of the sections, and a depending support connected with the pitman by the said pivot.

9. A dish washing machine comprising a casing, a rotary receptacle, a pump including a plunger, a reciprocatory pump rod connected with and turning freely in the plunger and provided with a crank, and means for connecting the crank with the receptacle for rotating the same.

In testimony, that I claim the foregoing as my own, I have hereto affixed my signature in the presence of two witnesses.

GEORGE BRANDER.

Witnesses:
E. J. CLAUSSEN,
A. J. INNES.